US007155347B2

(12) United States Patent
Going et al.

(10) Patent No.: US 7,155,347 B2
(45) Date of Patent: Dec. 26, 2006

(54) PRE-INERTING METHOD AND APPARATUS FOR PREVENTING LARGE VOLUME CONTAINED FLAMMABLE FUELS FROM EXPLODING

(75) Inventors: John Going, Kansas City, MO (US); Jef Snoeys, Rijkevorsel (BE)

(73) Assignee: Fike Corporation, Blue Springs, MO (US)

( * ) Notice: Subject to any disclaimer, the term of this patent is extended or adjusted under 35 U.S.C. 154(b) by 0 days.

(21) Appl. No.: 10/893,852

(22) Filed: Jul. 19, 2004

(65) Prior Publication Data

US 2006/0015266 A1 Jan. 19, 2006

(51) Int. Cl.
*G01N 31/00* (2006.01)

(52) U.S. Cl. .............................. 702/31; 702/1; 702/22; 702/30; 702/32; 222/3; 222/59

(58) Field of Classification Search ................. 702/31, 702/1, 30; 222/3, 52, 59, 61
See application file for complete search history.

(56) References Cited

U.S. PATENT DOCUMENTS 3,768,956 A * 10/1973 Mueller et al. ............... 431/20
4,977,527 A 12/1990 Shaw et al.
5,718,294 A * 2/1998 Billiard et al. ................ 169/61
6,839,636 B1 * 1/2005 Sunshine et al. ............. 702/22
2002/0027143 A1 * 3/2002 Schoenrock et al. ........ 222/209
2003/0230415 A1 * 12/2003 Wilson et al. ................ 169/61

* cited by examiner

*Primary Examiner*—Marc S. Hoff
*Assistant Examiner*—Phuong Huynh
(74) *Attorney, Agent, or Firm*—Hovey Williams LLP

(57) ABSTRACT

A method and apparatus employing a hydrofluorocarbon agent for preventing a large volume of contained flammable fuel from exploding are disclosed. Generally, a method of the present invention comprises detecting a hazardous condition proximate the contained flammable fuel and applying a hydrofluorocarbon agent to an area proximate the fluid within 3–5 seconds of the hazardous condition detection. An apparatus according to the invention comprises a sensing device (24) for detecting the presence of a hazardous condition proximate a quantity of contained flammable fuel (14), and a discharging unit including a pressurizable vessel (16) containing therein the hydrofluorocarbon agent, and a discharge nozzle (20) located proximate the contained flammable fuel (14) and operably coupled with the vessel (16).

14 Claims, 1 Drawing Sheet

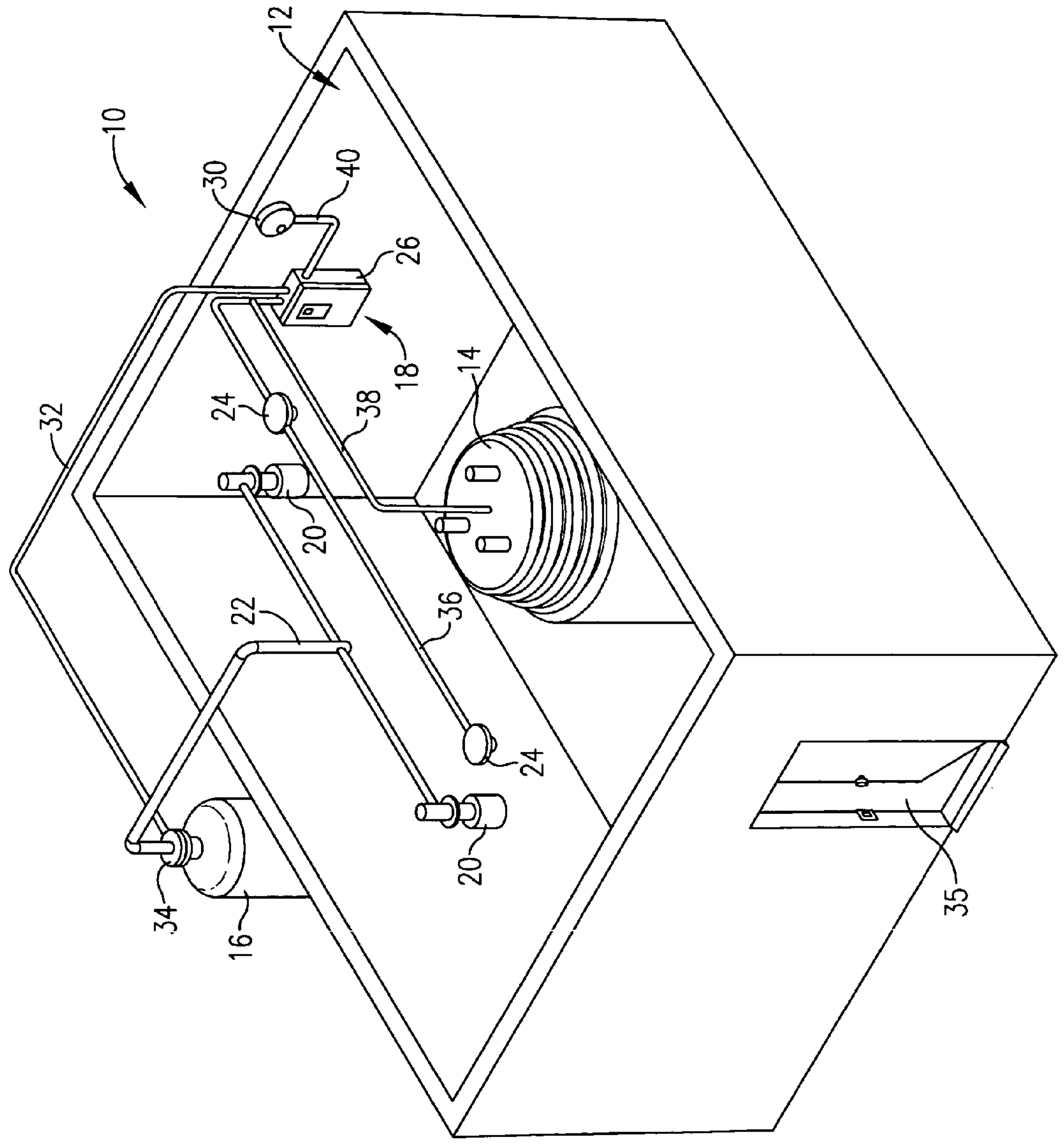
10
12
30
40
26
18
14
24
38
32
20
22
36
24
20
34
16
35

PRE-INERTING METHOD AND APPARATUS FOR PREVENTING LARGE VOLUME CONTAINED FLAMMABLE FUELS FROM EXPLODING

BACKGROUND OF THE INVENTION

1. Field of the Invention

The present invention generally pertains to pre-inerting apparatus and a method for preventing an incipient explosion of large volume of contained flammable fuels. The apparatus of method employ the use of non-ozone depleting hydrofluorocarbon agents to preclude an explosion from occurring.

2. Description of the Prior Art

Early detection and avoidance of incipient explosions has become a necessity in various industries in order to prevent catastrophic damage to physical facilities and injury to workers. Explosion mitigation is especially important in environments where large volumes of contained flammable fuels are present. Electric transformers are particularly susceptible to violent explosions primarily because the transformers are filled with isolating oil, and must handle high electric voltages. Having a flash point near 140° C., transformer oil is generally not flammable at moderate temperatures (40°–60° C.). However, due to aging and impurities of the oil, strong transients or other external impacts, a short-circuit and subsequent electric arc may take place inside a transformer. During the electric arc, the relatively large oil molecules are cracked into primarily hydrogen and acetylene gas. The gas volume generated is typically on the order of 0.05–0.10 $m^3$ per MJ of arc energy. This gas volume creates very high pressure within the transformer which may lead to failure of the transformer casing. When the transformer casing fails, the escaping flammable gas also generates sprays of oil into the transformer room thereby creating a flammable atmosphere, which may ignite in the presence of a sufficiently strong ignition source.

Environmental detection systems such as disclosed in U.S. Pat. No. 4,977,527, which is incorporated by reference herein, have been developed in order to detect conditions that can result in the development of a hazardous atmosphere. The detection system initiates operation of mitigation systems that interrupt and terminate the propagation of flame by chemical and physical methods. Such systems may also reduce the reactivity of the flammable material thereby reducing the flame speeds and explosion pressures. In order to accomplish these objectives, explosion suppression systems have generally employed rapid release of a suppressing agent such as bromochlorodifluoromethane (Halon 1211) or bromotrifluoromethane (Halon 1301), hereafter collectively referred to as Halon, into the space surrounding the transformer upon detection of a hazardous condition which may lead to an explosion.

While effective in explosion suppression and mitigation, Halon because of its bromine and/or chlorine content exhibits significant ozone depletion potential. In view of recent environmental treaties such as the Montreal and Kyoto Protocols, the use of Halon is being phased out. Therefore, there exists a real and unfulfilled need for a mitigation system for use in preventing large volume contained flammable fuels from exploding and that does not employ agents which present an ozone depletion problem.

SUMMARY OF THE INVENTION

The present invention overcomes the above problems and provides a pre-inerting method and apparatus for preventing large volume contained flammable fuels from igniting and exploding using a presently approved hydrofluorocarbon (HFC) suppressing agent. The method and apparatus of the present invention are particularly useful in mitigating transformer explosions brought about by formation of hazardous conditions proximate the transformer. Such hazardous conditions typically result from high energy short-circuits inside the transformer which lead to the "cracking" of transformer oil and the formation of hydrogen and hydrocarbon gases such as methane, acetylene, and ethylene. The build up of these gases can cause the transformer casing to rupture and, if an ignition source is present, the resulting oil and gas mixture to explode violently.

Methods of preventing large volume contained flammable fuels from igniting and exploding according to the present invention generally comprise detecting a hazardous condition in close proximity to the contained flammable fuel, followed by the timely and complete application of an HFC agent to an area proximate said fuel typically within 3–5 seconds. Preferred HFC agents for use with the invention include 1,1,1,3,3,3-hexafluoropropane (hereafter referred to as hexafluoropropane) and 1,1,1,2,3,3,3-heptafluoropropane (hereafter referred to as heptafluoropropane), sold by Du Pont Fluoroproducts under the names FE-36® and FE-227®, respectively. Hexafluoropropane is the most preferred HFC agent for use with the present invention.

Detection of conditions leading to the creation of a hazardous atmosphere is required in order to prevent ignition. Hazardous condition detection may comprise sensors for detecting a change in pressure due to the pressure wave generated in advance of the incipient stages of deflagration leading to an explosion. The sensors will typically monitor parameters such as pressure using pressure transducers in the transformer, for example, or in a protected area such as room. Explosion detection most commonly comprises detecting a change in pressure due to the pressure wave generated in the incipient stages of a deflagration. Detectors that sense the presence of smoke, heat, dust, or gasses above a predetermined level may be used. Other means of detection may include optical detection of ignition sources including electrical faults or sparks resulting from high voltage short circuits within the transformer or connected electrical net, rupture of the transformer case, or manual release.

Optical sensors may be used in combination with the pressure sensing devices. The optical sensors are capable of detecting electric discharges, or arcs, which, especially in the case of electrical transformers, can indicate a high voltage short-circuit in close proximity to the contained flammable fuel that could provide an ignition source for an explosion. Optical sensors may also be used to detect the initial flash of electromagnetic radiation (including infrared, visible light and ultraviolet) emitted by an incipient explosion.

Once a hazardous condition is detected, a signal is sent from the sensing device to a discharging unit for rapidly dispensing a sufficient quantity of HFC agent to an area proximate the contained flammable fuel for prevention of ignition of the fuel. The discharging unit comprises at least one pressurizable vessel containing the HFC agent. The quantity of agent sufficient to prevent the explosion will largely depend upon the volume of contained flammable fuel involved and the nature of the space wherein the fuel is located. The larger the volume of fuel, the greater the quantity of HFC agent which should be used. Likewise, if the contained fuel is located in a more open space rather than a confined room, more HFC agent may be necessary. However, it is required that the quantity of HFC agent released not be so great so as to render the ambient air unbreatheable if occupied. An advantage of the present invention is the fact that HFC agents employed in the present apparatus and method are capable of preventing an explosion without causing severe health repercussions to persons in the vicinity of the contained flammable fuel. Preferably, the concentration of HFC agent should not exceed Lowest Observable Adverse Effect Level (LOAEL) for the space proximate to the contained flammable fuel.

The HFC agents at the concentrations introduced into a protected area should be relatively non-toxic to humans at moderate exposure levels. For example, toxicity tests for both hexafluoropropane and heptafluoropropane show no remarkable clinical signs of toxicities upon subjects over a 90-day period. Furthermore, exposure levels below the LOAEL v/v do not produce blood levels of HFC which would lead to cardiac sensitization.

The HFC should be applied proximal to the contained fuel immediately after detection of hazardous conditions. The HFC should be delivered sufficiently fast so as to create an inerted atmosphere in minimal time, typically 3–5 seconds Also included within the discharging unit is at least one and preferably a plurality of discharge nozzles of the agent at a discharge located proximate the contained flammable fuel and operably coupled with the pressurizable vessel. The nozzles are preferably coupled with the HFC-containing vessels via a piping or manifold system.

The discharging unit further comprises a controller unit which is electrically coupled with the transducers thereby receiving and analyzing the signals therefrom. Upon detection of a hazardous condition, the controller triggers the release of HFC agent.

Once the risk of an explosion has been averted, the space proximate the contained flammable fuel is vented. Venting removes the flammable gases and flammable liquid mist which lead to the creation of the hazardous condition. Venting also removes the HFC agent thereby avoiding any adverse effects on human health from prolonged exposure to the agent.

BRIEF DESCRIPTION OF THE DRAWING

The FIGURE is an isometric view of an explosion detection and mitigation system constructed in accordance with a preferred embodiment of the invention and shown installed in a protected area proximate a large volume of contained flammable fuel.

DETAILED DESCRIPTION OF THE PREFERRED EMBODIMENT

Turning now to the FIGURE, an explosion detection and mitigation system 10 constructed in accordance with a preferred embodiment of the present invention is shown installed in and around a protected area 12. In the exemplary area 12, an electrical transformer 14 is depicted, and which has a quantity of transformer oil therein. The system 12 broadly includes a pressurized vessel 16 containing a quantity of an inerting agent such as hexafluoropropane or heptafluoropropane under pressure. A detection system 18 is provided having a control system 26 for early detection of an explosion hazard in the protected area 12. An electrical conduit 32 preferably connects control system 26 to an electrically responsive, gas cartridge activated, inerting agent release rupture disc within an actuator housing 34 connected to an agent outlet of vessel 16. Vessel 16 is located outside of area 12 and is operably coupled with nozzles 20 located inside area 12 via manifold system 22. The rupture disk (not shown) within actuator housing 34 retains the pressurized inerting agent in vessel 16. However, when an untoward event is sensed by the detection system 18 resulting in actuation of the rupture disc, the inerting agent is released to manifold 22 for delivery from respective nozzels 20 into the protected area 12.

In more detail, detection system 18 broadly comprises one or more optical or electrical event sensors or pressure transducers 24 spaced throughout area 12, or combinations thereof, and may include a sensor attached to or mounted inside of the transformer. The controller 26 is electrically coupled to the sensors 24 and electrical transformer 14 by lines 36 and 38 respectively, and to the electrically operated, gas cartridge actuated rupture disc within actuator housing 34 on vessel 16, via line 32. An alarm device 30 may be operably coupled to the controller 26 by line 40. Detection and control system 18,26 may also be coupled with other devices such as a remote monitoring station (not shown).

The sensors 24 are each operable to continuously monitor conditions which characterize a developing hazard, and to generate representative output signals. The sensors will typically monitor parameters such as pressure (in transformer 14, or in protected area 12), smoke, heat, dust, and gasses. Other means of detection (not shown) may include for instance detection of electrical sparks, faults within the transformer or connected electrical net, optical detection of a variety of ignition sources, or manual release.

Controller 26 monitors the detection signals and triggers the activation of the rupture disc within actuator housing 36 on vessel 16, thereby opening the rupture disc to release the agent from vessel 16 into protected area 12. The mitigating agent is released through nozzles 20 into area 12 for preventing an explosion. The controller may also energize the alarm device 30 to provide a warning.

Area 12 may be vented through doorway 35, or any other passageway constructed in the area for venting purposes. Venting the area serves to remove not only the agent, but also any flammable gases which may have been produced leading up to the hazardous condition which necessitated mitigating agent release.

EXAMPLE

The following example sets forth preferred methods of preventing transformer oil explosions according to the present invention. It is to be understood, however, that these examples are provided by way of illustration and nothing therein should be taken as a limitation upon the overall scope of the invention.

1. Experimental Procedure

The following experiments were performed in a 50 $m^3$ test room. The room was 8 m long, 2.5 m high and 2.5 m wide. A large steel box (5 m×1.1 m×0.9 m) was used to represent a transformer. The box was positioned against one of the 8 m sidewalls and raised slightly from the floor. The test room was equipped with adjustable vent openings thereby enabling different confinement levels to be tested. During the experiments, the vents were adjusted to yield vent openings of either 25% or 6% (75% or 94% blockage). A total of seven pressure transducers were located throughout the test room to measure the explosion pressure within the room, five in the roof and two along the 8 m sidewall adjacent the transformer box approximately 0.5 m above the floor.

A spark generator, a car spark plug, was used as an ignition source and was able to produce a spark or arc of variable duration. A 400 V DC power supply was used to power the spark generator. The spark gap was held constant at 3.0–3.5 mm and the duration of the spark was held constant at approximately 150 ms. The ignition system was also equipped with a 2 kJ chemical back-up ignitor in case the spark failed to ignite the fuel mixture. The chemical ignitor was automatically fired 1.0 s after the spark. The ignition source was positioned about 1 m above the floor of the test room, about 2.8 m from the lengthwise center of the room, and approximately in the middle width of the room.

Diala® DX transformer oil from Shell Oil Company having an oil density of 0.88 kg/m$^3$ was used in the experiments. The transformer oil was kept in four 1-liter steel vessels designed to withstand a pressure of 125 bar. Compressed air from a 50 liter gas bottle was used to maintain a pressure of approximately 20 bar inside the oil vessels. At the start of each experiment, a pneumatically operated ball valve at the bottom of each tank was opened for a predetermined duration and the oil was pressed through short steel pipes and through impingement nozzles into the test room. A total of 8 nozzles (two per supply tank) of the type BETE P66 with a K-factor of 1.71 were used.

The oil dispersion nozzles were located in a line along the 8 m sidewall of the test room near the top of the transformer box. The nozzles were pointed toward the opposite 8 m wall at an upward angle of either approximately 22° or 45°. The nominal droplet size distribution of mist produced from the nozzles was estimated by the supplier to be from 25–400 μm. for pressures from 1 barg to 30 barg. However, due to the high pressures used during the present experiments, the droplet size was estimated to lie in the range of 25–100 μm.

Hydrogen gas (industrial quality) was used to simulate all the gases produced when a large transformer failure occurs. A gas reservoir comprising ten 50-liter bottles supplied the gas release system. The gas first flowed through an adjustable reduction valve to reduce the pressure to the desired release line pressure. The gas then flowed through a flow restriction orifice and hose before it entered the room through a 12 mm nozzle. The length of time the valve was open along with the flow rate of gas through the valve was measured to determine the quantity of gas fed into the room.

The time delay between fuel valve shut-off and ignition was fixed at either 3 or 4 seconds, depending on which ignition source was successful.

Tests were performed to compare among other things the explosion mitigating effect of hexafluoropropane (FE-36®) and heptafluoropropane (FE-227®) fluorocarbon agents, both obtained from Du Pont. An explosion mitigation test system was activated by a signal detecting the initiation of gas and oil release, indicating the onset of an incipient explosion. Activation of the mitigation system was determined by a logic sequence taking into account variables such a pressure (P), dP/dt, and optical detection (UV). The fluorocarbon agents were discharged in each instance from a single 45-liter bottle, pressurized to 25 barg, via a 4-nozzle dispersion system with an associated manifold and piping system located within the test chamber. Upon release, a total of 38 kg of FE-36® or 41 kg of FE-227® were determined to have discharged during a respective test.

2. Experiments and Results

Six experiments were performed using the test room, transformer box, oil and hydrogen mixture, and explosion protection unit. The details of the experimental conditions are set forth in Table 1. The fuel concentrations of both oil and hydrogen gas are quoted in terms of "% stoichiometry." This is intended to give a measure of the amount of fuel represented by each component relative to an "ideal" mixture (100% stoichiometric). For example, a mixture containing "25% hydrogen" represents an amount of gas that corresponds to a homogeneously mixed gas cloud within the entire test room with a concentration of 25% stoichiometric. The equivalent average hydrogen concentration, in terms of "% Volume" (based on the volume of the test room), is 0.296 times the value given as "% of stoichiometry." A similar definition of concentration applies to the oil fuel component, however a rough assumption that only 50% of the oil contributes to the explosion is done before calculating the "% of stoichiometry." The absolute fuel concentrations (oil and gas) and their degree of homogeneity are unknown due to the generation of the fuel cloud by means of two parallel high-pressure releases.

TABLE 1

| | | Oil release | | | | | Gas release | | | | | | Release | Release |
|---|---|---|---|---|---|---|---|---|---|---|---|---|---|---|
| | Vent | Rate | | Duration | | | Rate | | Duration | | | | Start- | Stop- |
| | Config. | | Meas- | | Meas- | Conc'n | | Meas- | | Meas- | Conc'n. | | Ign. | Ign. |
| Test # | (% closed) | Nominal (kg/s) | ured (kg/s) | Nominal (s) | ured (s) | % of stoich. | Nominal (kg/s) | ured (kg/s) | Nominal (s) | ured (s) | % of stoich. | % Vol $H_2$ | Delay (s) | Delay (s) |
| 1 | 75% | 0.957 | 0.892 | 2.75 | 2.75 | 34.56 | 0.06 | 0.059 | 6 | 6.05 | 34.6 | 10.2 | 9 | 3 |
| 2 | 75% | 0.904 | 0.878 | 3.3 | 3.3 | 40.81 | 0.07 | 0.068 | 6 | 5.97 | 39.6 | 11.7 | 9 | 3 |
| 3 | 75% | 0.874 | 0.897 | 3.9 | 3.88 | 49.04 | 0.08 | 0.07 | 6 | 5.98 | 40.7 | 12 | 9 | 3 |
| 4 | 75% | 0.874 | 0.872 | 3.9 | 3.9 | 47.91 | 0.08 | 0.079 | 6 | 6 | 46.2 | 13.6 | 9 | 3 |
| 5 | 75% | 0.874 | 0.887 | 3.9 | 4 | 49.95 | 0.08 | 0.079 | 6 | 6 | 45.7 | 13.5 | 9 | 3 |
| 6 | 75% | 0.874 | 0.884 | 3.9 | 3.89 | 48.42 | 0.08 | 0.077 | 6.2 | 6.23 | 46.3 | 13.7 | 9 | 2.8 |

The rate of oil injected was determined by control of the pressure applied through 8 nozzles of known K-factor. From time, the quantity and concentration of oil dispersed was calculated. Hydrogen gas release was determined by measurement of the upstream temperature and pressure and the differential pressure across a flow restriction orifice. The column labeled "Release Start-Ign. Delay" represents the time from the start of the fuel release until activation of the ignition source. The column labeled "Release Stop-Ign.

Delay" represents the time from the stop of fuel release until activation of the ignition source.

Table 2 sets forth the details of the particular protection system used and the result of each ignition test. In those tests in which an explosion occurred, the explosion pressure was measured as the average pressure sensed by the seven pressure transducers spaced throughout the test room. From this pressure measurement, pressure impulse and the rate of pressure rise ($dp/dt_{max}$) were determined. Pressure impulse is the time integral of the pressure curve and is a measure of the explosion load experienced during the test. It is beneficial to have as low an impulse as possible. The rate of pressure rise ($dp/dt_{max}$) is the differential of the pressure curve with respect to time and gives a measure of the "speed" of the explosion. The higher this parameter is, the more violent is the explosion development.

TABLE 2

| Test | Protection System Configuration Fluorocarbon | Test result | Explosion pressure (mbarg) | Pressure impulse (mbar s) | $dp/dt_{max}$ (bar/s) |
|---|---|---|---|---|---|
| 1 | FE-36 ® | No ignition | — | — | — |
| 2 | FE-36 ® | No ignition | — | — | — |
| 3 | FE-36 ® | No ignition | — | — | — |
| 4 | FE-36 ® | No ignition | — | — | — |
| 5 | FM-227 ® | No ignition[1] | — | — | — |
| 6 | FM-227 ® | Ignition | 250 | 41 | 2.5 |

[1]In test 5, no ignition was achieved due to ignition source failure.

The mitigation systems employing FE-36® were found to be effective in preventing ignition of the oil and hydrogen mixtures. While the systems employing FM-227® gas did in one instance ignite, the explosion that occurred was very weak.

The invention claimed is:

1. A method of preventing a large volume of contained flammable fuel from exploding comprising the steps of:

detecting a hazardous condition proximate said contained flammable fuel;

applying an amount of hydrofluorocarbon agent up to 3–5 seconds of said hazardous condition detection sufficient to inert an area proximate to said fuel that will prevent ignition of the fuel; and controlling the rate of application of the hydrofluorocarbon agent to prevent the quantity of the agent introduced into said area proximate to said fuel being sufficient to render the ambient air unbreathable by persons near the contained fuel and venting said area after application of said hydrocarbon agent.

2. The method of claim 1, wherein is included the step of simultaneously applying quantities of the agent to the area to be inerted from a plurality of individual, spaced agent outlets.

3. The method of claim 1, wherein is included the steps of maintaining the agent under pressure until release thereof, and providing a rupture disc operable to control release of the agent upon rupture of the disc in response to detection of a hazardous condition proximate to the contained flammable fuel.

4. The method of claim 1, wherein said hydrofluorocarbon agent is selected from the group consisting of hexafluoropropane and heptafluoropropane.

5. The method of claim 1, wherein said hazardous condition detection step comprises detecting condition proximate said contained flammable fuel selected from the group consisting of a change in pressure, a container rupture, electrical fault or short circuit, and electromagnetic radiation.

6. An apparatus for mitigating explosion of a large volume of contained flammable fuel comprising:

a sensing device for detecting the presence of a hazardous condition in close proximity to said contained flammable fuel; and a discharging unit for dispensing a sufficient quantity of a hydrofluoro carbon agent to an area proximate said contained flammable fuel within 3–5 seconds upon receiving a signal from said sensing device for prevention of ignition and an explosion, said discharging unit being operable to control the rate of application of the hydrofluorcarbon agent to prevent the quantity of agent introduced into said area proximate to said fuel rendering the ambient air unbreathable by persons near the contained fuel, said discharging unit including at least one pressurizable vessel containing said hydrofluorocarbon agent and at least one discharge outlet located in close proximity to said contained flammable fuel and operably coupled with said vessel.

7. The apparatus as set forth in claim 6, wherein is provided a plurality of spaced, separate discharge outlets for simultaneous delivery of the agent to said area proximate the contained flammable fluid.

8. The apparatus as set forth in claim 6, wherein said discharge unit includes a rupture disc which is rupturable in response to detection of a hazardous condition by the sensing device to effect release of the agent for delivery to the area proximate the contained flammable fuel.

9. The apparatus as set forth in claim 6, wherein each of said outlets is a nozzle directed toward the area proximate the contained flammable fuel.

10. The apparatus of claim 6, wherein said sensing device comprises a pressure sensing device.

11. The apparatus of claim 6, wherein said sensing device comprises an optical detection device.

12. The apparatus of claim 6, wherein said sensing device comprises an electrical arc sensing device.

13. The apparatus of claim 6, wherein said sensing device comprises a device for sensing rupture of the container for the flammable fuel.

14. The apparatus of claim 6, wherein said hydrofluorocarbon agent is selected from the group consisting of hexafluoropropane and heptafluoropropane.

* * * * *

UNITED STATES PATENT AND TRADEMARK OFFICE

CERTIFICATE OF CORRECTION

PATENT NO. : 7,155,347 B2
APPLICATION NO. : 10/893852
DATED : December 26, 2006
INVENTOR(S) : John Going and Jef Snoeys It is certified that error appears in the above-identified patent and that said Letters Patent is hereby corrected as shown below:

Title Page, Item (54), and Col. 1, Ln. 1-3
Title correctly reads --PRE-INERTING METHOD AND APPARATUS FOR PREVENTING LARGE VOLUME CONTAINED FLAMMABLE FLUIDS FROM EXPLODING--

Signed and Sealed this

Seventh Day of August, 2007

JON W. DUDAS
*Director of the United States Patent and Trademark Office*